FREQUENCY CONVERTER SYSTEM FOR RADIO RECEIVERS

Filed Nov. 19, 1948 3 Sheets-Sheet 1

FIG. I

INVENTOR.
BERNARD D. LOUGHLIN
BY John A. Harvey
ATTORNEY

Oct. 14, 1952 B. D. LOUGHLIN 2,614,212

FREQUENCY CONVERTER SYSTEM FOR RADIO RECEIVERS

Filed Nov. 19, 1948 3 Sheets-Sheet 2

INVENTOR.
BERNARD D. LOUGHLIN

BY John A. Harvey

ATTORNEY

Oct. 14, 1952 B. D. LOUGHLIN 2,614,212

FREQUENCY CONVERTER SYSTEM FOR RADIO RECEIVERS

Filed Nov. 19, 1948 3 Sheets-Sheet 3

INVENTOR.
BERNARD D. LOUGHLIN

BY John A. Harvey

ATTORNEY

Patented Oct. 14, 1952 2,614,212

UNITED STATES PATENT OFFICE 2,614,212

FREQUENCY CONVERTER SYSTEM FOR RADIO RECEIVERS

Bernard D. Loughlin, Lynbrook, N. Y., assignor to Hazeltine Research, Inc., Chicago, Ill., a corporation of Illinois Application November 19, 1948, Serial No. 61,055

1 Claim. (Cl. 250—20)

Figure 1:
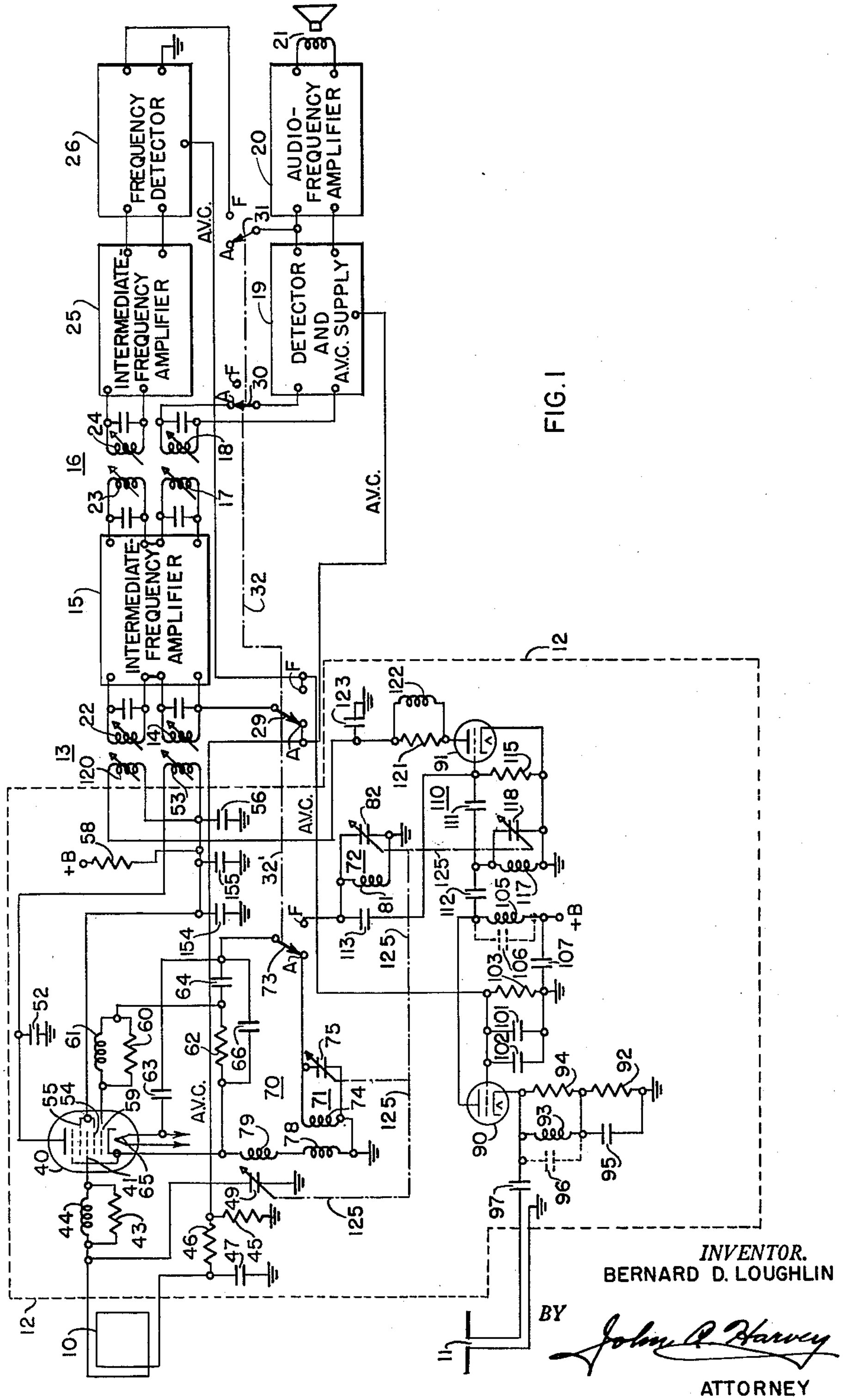

This invention relates to frequency-converter systems and, particularly, to frequency-converter systems for effecting translation of wave signals having individual different frequencies selectively through either of two wave-signal translating channels. Although the invention is of general application, it has particular utility in wave-signal receivers for receiving amplitude-modulated wave signals in the broadcast band and angular-velocity-modulated wave signals in the frequency-modulation band. The term "angular-velocity-modulated wave signals," as employed throughout the specification and claim, is intended to denote either frequency-modulated wave signals or phase-modulated wave signals. The invention has further utility in television wave-signal receivers adapted for selective operation on different television channels and also in connection with wave-signal receivers adapted to receive both television wave signals and amplitude-modulated sound signals when the frequencies of these signals are widely separated.

Wave-signal receivers having facilities for the selective reception of wave signals in two or more frequency bands, for example in the amplitude-modulation band in the vicinity of one megacycle and in the frequency-modulation band in the region of 100 megacycles, have been relatively widely employed. Such receivers ordinarily include individual input circuits for applying wave signals intercepted by individual antennas to suitable wave-signal selectors which are, in turn, coupled in cascade in the order named with a frequency-converter system or systems adapted for selective operation in each of the two frequency bands, suitable intermediate-frequency amplifier stages which may have widely separated intermediate-frequency pass bands to enable the stages to be common to both the amplitude-modulation channel and the frequency-modulation channel of the receiver, an amplitude-modulation detector and a frequency detector, an audio-frequency amplifier coupled to both of the detectors, and a sound-reproducing device. Band-switching arrangements are employed selectively to couple the proper units in a selected channel in operative relation to provide reception in a desired one of the frequency bands. Such switching arrangements are sometimes relatively complex and expensive and often necessitate longer electrical connections than can be tolerated to assure good operation of the receiver in the high-frequency band thereof. For example, the radio-frequency and intermediate-frequency portions of the frequency-modulation channel of the receiver involve frequencies so high that it is important to maintain extremely short electrical connections to minimize the effects of inductive reactance which may contribute to various troubles such as the production of undesirable parasitic oscillations. It is frequently difficult to employ sufficiently short electrical connections in the band-switching arrangements of some receivers to ensure optimum reception of both amplitude-modulated and frequency-modulated wave signals.

Other receivers, having provisions for selectively receiving amplitude-modulated and frequency-modulated wave signals, avoid some of the above-mentioned difficulties caused by relatively complex band-switching arrangements by employing a separate carrier-frequency selector circuit and a separate frequency-converter arrangement for each of the two wave signal bands. This expedient permits the use of a relatively simple switching arrangement in that it involves selectively switching only the anode-energizing circuits of the electron tubes in the two high-frequency portions of the receiver channels. However, such a receiver has the disadvantage of requiring between the receiver input terminals and the first intermediate-frequency amplifier stage two complete high-frequency signal-translating channels, thus necessitating the use of a greater number of tubes and other electrical components than is desirable for many applications.

The pentagrid type of converter tube has found wide application in frequency-converter systems in receivers which are adapted for selective operation in the amplitude-modulation and frequency-modulation bands. This is partly due to its simplicity since it comprises a single electron tube which serves both as a modulator tube and a heterodyne oscillator tube. Such a tube is particularly desirable in the amplitude-modulation channel of a receiver since this tube ordinarily has a remote cutoff characteristic, thus permitting an automatic-volume-control potential or A. V. C. potential to be applied to the signal-input electrode thereof not only to control the conversion gain but also for the purpose of minimizing undesirable distortion of the amplitude modulation.

The use in a two-band receiver of the type under consideration of a triode-tube type of modulator in the amplitude-modulation portion of the frequency-converter system, in lieu of a pentagrid converter, is less desirable because the anode current of a triode modulator usually contains numerous frequency components harmonically related to the fundamental frequency of the heterodyne oscillator. This in turn produces conversion of undesirable high-frequency wave signals to intermediate-frequency wave signals which may produce undesirable interference. Since the triode type of modulator utilizes a modulator tube having a sharp anode-current cutoff characteristic, it is generally undesirable to apply an automatic-volume-control potential to a triode modulator because of the serious distortion of amplitude modulation which results when strong signals are applied thereto. Further, experience with frequency converters employing triode modulators associated with triode heterodyne oscillators has indicated that it is very desirable to apply the heterodyne oscillations to the cathode circuit of the modulator. This may be accomplished, for example, by coupling the cathode of the modulator tube to the cathode of the heterodyne oscillator tube. When an automatic-volume-control potential is applied to the control electrode of the triode modulator tube in such a frequency-converter arrangement, it undesirably alters the frequency of the heterodyne oscillator because a change in the input impedance of the modulator tube is reflected into the frequency-determining circuit of the oscillator. Accordingly, a triode type of frequency converter is less satisfactory than a pentagrid converter in the amplitude-modulation channel of a combined amplitude-modulation and frequency-modulation receiver.

Although the pentagrid-converter tube is very desirable for frequency-conversion purposes in the amplitude-modulation channel of a receiver, it presents a number of difficulties when operating at high frequencies such as those in the vicinity of the frequency-modulation band. For example, a variation in the volume-control potential applied to the signal-input electrode of the pentagrid converter will substantially alter the frequency of the oscillator portion thereof at the high frequencies just mentioned. At the lower frequencies in the region of the amplitude-modulation band, any change of oscillator frequency is not serious. It has been found that most efficient frequency conversion may be procured with a pentagrid converter when the cathode of the tube is operated at a low radio-frequency potential with respect to ground. The heterodyne oscillator portion of the pentagrid converter is usually of the Hartley type and the cathode of the tube is coupled to a tap on the inductor in the frequency-determining circuit of the oscillator. It has been determined in practice that the adjustment of this tap to provide good operation at high frequencies is extremely difficult, and usually requires a fractional-turn tap adjustment. Serious difficulty is also experienced with parasitic oscillations in a pentagrid-converter arrangement operating at the very high frequencies required for reception in the frequency-modulation band. These parasitic oscillations cause a reduction in conversion efficiency. For these reasons, therefore, the pentagrid-converter arrangement is not usually considered as satisfactory for high-frequency applications as for low-frequency applications.

At the high operating frequencies required for reception in the frequency-modulation band, the use of a modulator employing a triode tube affords a number of advantages over one including a pentagrid-converter tube. The cathode circuit of a triode modulator may be operated at ground potential and a high conversion efficiency may be realized. A considerably better signal-to-noise ratio may also be obtained with a triode modulator operating in the frequency-modulation band as compared with a pentagrid converter functioning in the same band.

Television wave-signal receivers are arranged for selective operation in individual ones of a plurality of high-frequency channels within the range of 54 to 216 megacycles. Such receivers frequently employ a single dipole antenna for operation over the entire frequency range just mentioned. It has been determined that the direction of maximum response of such a wave-signal antenna and its value of impedance ordinarily vary with the operating frequency over the wide frequency range employed in television transmission. Accordingly, the directivity characteristic and impedance of the dipole antenna operating at the lowest frequency television channel may be considerably different from its characteristics when operating at the highest frequency channel. Even though its characteristics do not appreciably change when only two near-adjacent channels are considered, the diverse locations of transmitting stations using these channels in a given geographical area may often necessitate a compromise in the selection of the fixed direction of response chosen during the installation of the single dipole antenna. These characteristics may be very undesirable since the adjustment of the physical position of the antenna and the selection of its impedance value to provide optimum receiver operation in a low-frequency television channel may likely result in poor reception by the receiver on a high-frequency television channel, or vice versa. It would, therefore, appear desirable to employ a plurality of dipole antennas for each television receiver with the antennas so constructed and arranged that each provides a predetermined directivity and value of impedance for an individual television channel or a small number of adjacent channels. The use of a plurality of such antennas with a television receiver would ordinarily require a relatively complex and expensive high-frequency antenna-switching arrangement. Accordingly, it would be extremely desirable to be able to employ a plurality of wave-signal antennas for operation with a television receiver without at the same time requiring the use of a complex and costly antenna-switching arrangement for selectively coupling the various antennas to the receiver.

It is an object of the invention, therefore, to provide a new and improved frequency-converter system, for effecting translation of wave signals having individual different frequencies selectively through either of two wave-signal translating channels, which avoids one or more of the above-mentioned limitations and disadvantages of prior frequency-converter systems.

It is a further object of the invention to provide a new and improved frequency-converter system, for effecting translation of wave signals having individual different frequencies selectively through either of two wave-signal translating channels, which selectively utilizes in the two channels pentagrid-converter and triode electron tubes.

It is yet another object of the invention to provide a new and improved frequency-converter system, for effecting translation of wave signals having individual different frequencies selectively through either of two wave-signal translating channels, which is characterized by its simplicity of construction, inexpensiveness to manufacture, and efficiency of operation.

It is an additional object of the invention to provide a new and improved frequency-converter system, for effecting translation of wave signals having individual different frequencies selectively through either of two wave-signal translating channels, which provides a large signal output in each channel while requiring only a small number of the electron tubes.

It is another object of the invention to provide a new and improved frequency-converter system, for effecting a translation of amplitude-modulated wave signals and frequency-modulated wave signals having individual different frequencies selectively through individual ones of two wave-signal channels, which provides a high conversion efficiency for both amplitude-modulated wave signals and frequency-modulated wave signals.

In accordance with a particular form of the invention, a frequency-converter system for effecting translation of modulated wave signals, having individual different frequencies, selectively through either of two wave-signal translating channels comprises a first modulator, including a first electron-discharge device included in only one of the channels, adapted to have wave signals of a first frequency applied thereto. The frequency-converter system also includes a second modulator, including a self-quench superregenerative amplifier having a second electron-discharge device in only the other of the channels, adapted to have wave signals of a second frequency applied thereto. The system further includes a single controllable-frequency heterodyne oscillator for both of the modulators, electron-coupled to the first electron-discharge device, for applying to the modulators heterodyne wave signals and including a control for adjusting the frequency of the oscillator to cause the modulators by frequency conversion selectively to translate individual ones of the applied wave signals, the aforesaid heterodyne oscillator forming with the superregenerative amplifier a self-quench superregenerative system for deriving in the amplifier the modulation components of the wave signals of the second frequency.

For a better understanding of the present invention, together with other and further objects thereof, reference is had to the following description taken in connection with the accompanying drawings, and its scope will be pointed out in the appended claims.

Figure 2:
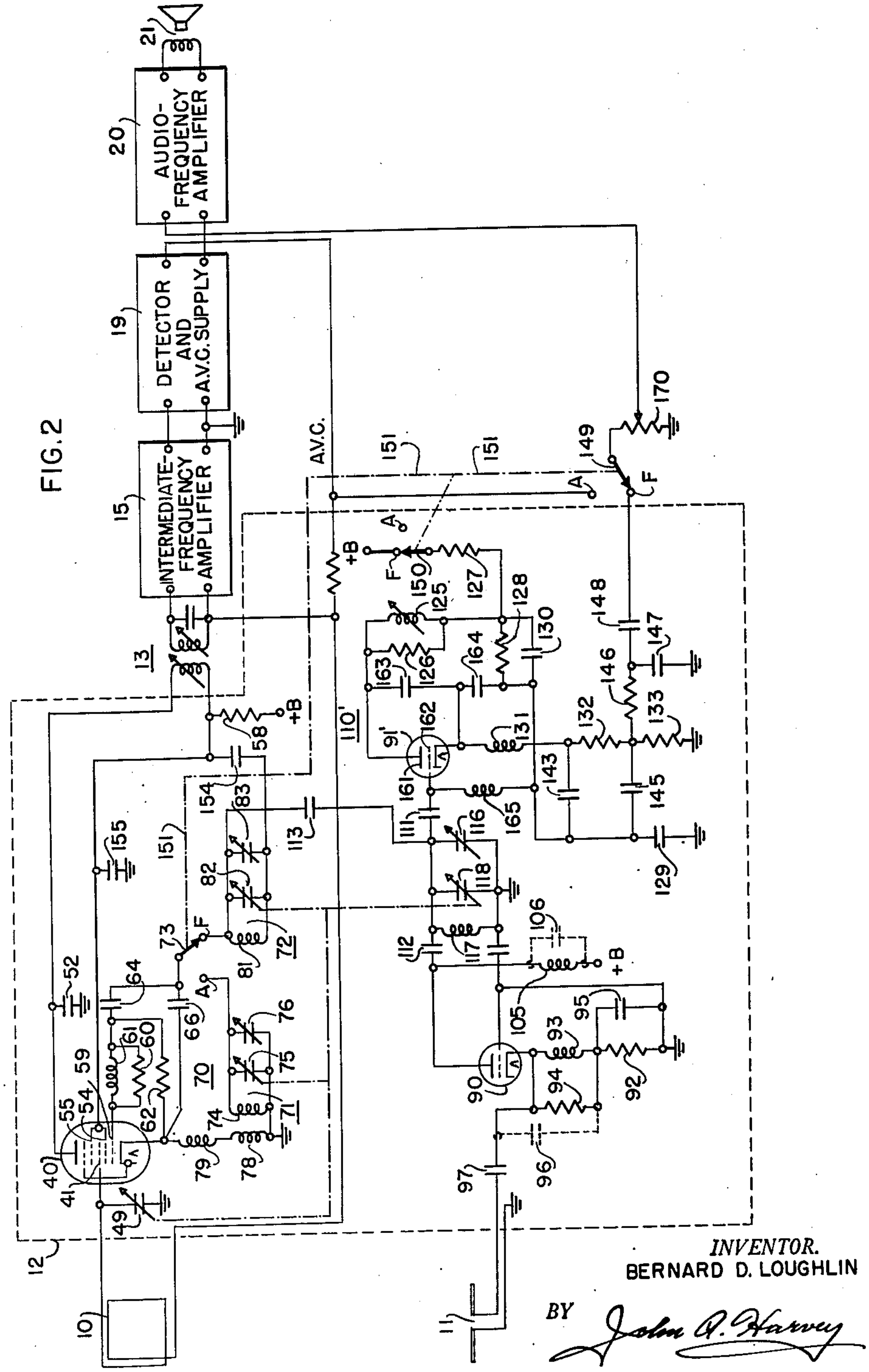
Figure 3:
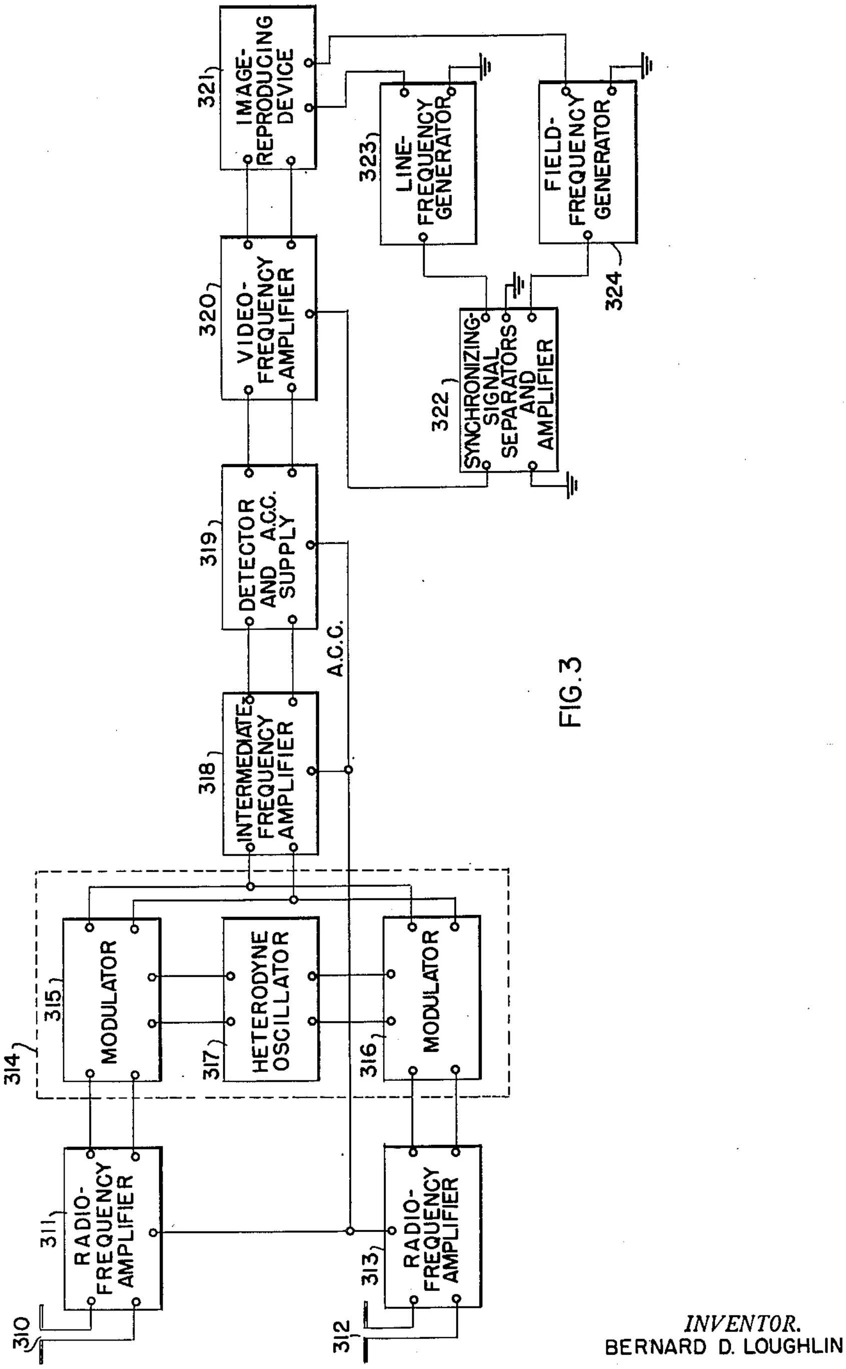

Referring now to the drawings, Fig. 1 is a circuit diagram, partly schematic, of a complete two-band wave-signal receiver which includes a frequency-converter system embodying the present invention in a particular form; Fig. 2 is a circuit diagram, partly schematic, of a similar receiver which includes a frequency-converter system embodying the invention in a modified form; and Fig. 3 is a circuit diagram of a television wave-signal receiver which includes a frequency-converter system embodying the present invention.

Referring now more particularly to Fig. 1 of the drawings, the two-band wave-signal receiver there represented comprises one of the superheterodyne type which is adapted selectively to translate amplitude-modulated and frequency-modulated wave signals. This receiver preferably includes a loop antenna 10 for intercepting amplitude-modulated wave signals and a dipole antenna 11 of suitable dimensions for intercepting frequency-modulated wave signals. These antennas are coupled to individual ones of a pair of input circuits of a frequency-converter system 12 which is included in a first wave-signal translating channel for translating the amplitude-modulated wave signals and also is included in a second wave-signal translating channel for translating the frequency-modulated wave signals. An output circuit of the frequency converter 12 is coupled to an amplitude-modulation signal-translating channel which includes in cascade, in the order named, a transformer 13 having a tuned primary winding 53 and a tuned secondary winding 14 in the input circuit of an intermediate-frequency amplifier 15 of one or more stages, a transformer 16 having a pair of tuned windings 17 and 18, a detector and A. V. C. supply 19, an audio-frequency amplifier 20 of one or more stages, and a sound-reproducing device 21. The windings 53, 14, 17 and 18 of the transformers 13 and 16 are tuned to the derived amplitude-modulated intermediate-frequency wave signal.

The wave-signal receiver further includes a second wave-signal translating channel for translating frequency-modulated wave signals and the frequency converter 12 is also included in this channel. To this end, a second output circuit of the system 12 is coupled in cascade, in the order named, through a second pair of windings of the transformer 13 including a tuned primary winding 120 and a tuned secondary winding 22 to the intermediate-frequency amplifier 15, a second pair of tuned primary and secondary windings 23 and 24 of the transformer 16, an additional intermediate-frequency amplifier 25, a frequency detector 26, the audio-frequency amplifier 20, and the signal-reproducing device 21. Units 20 and 21 are thus common to both the amplitude-modulation and frequency-modulation wave-signal translating channels. The windings 120, 22, 23, and 24 of the transformers 13 and 16 are tuned to the derived intermediate frequency of the received frequency-modulated wave signals.

An automatic-amplification-control or A. V. C. bias which is developed by the detector 19 is applied through a circuit designated A. V. C. to a switch point A associated with a switch blade 29, and a similar bias derived by the frequency detector 26 is applied through a similarly identified circuit to a switch point F associated with the same switch blade. Switch points A and F are also connected to the frequency-converter system 12 in a manner more fully to be described hereinafter. A switch blade 30 in the input circuit of the detector and A. V. C. supply 19 is arranged selectively to be operated between its switch points A and F by which selectively to complete the input circuit through the transformer winding 18. A switch blade 31 is arranged to be operated between its switch points A and F by which selectively to couple the output circuit of the frequency detector 26 to the input circuit of the audio-frequency amplifier 20. The switch blades 29, 30 and 31 are mechanically interconnected for unicontrol operation as indicated by the broken lines 32, 32.

It will be understood that the various components or units 10–21, inclusive, with the exception of the frequency-converter system 12, may be of conventional construction and operation so that a detailed description and explanation of the operation thereof are unnecessary. Considering briefly, however, the general operation of the described receiver as a whole, but neglecting for the moment the detailed operation of the frequency-converter system 12, it will be assumed initially that the switch blades 29, 30 and 31 are moved into engagement with their respective switch points A. This switching operation completes electrical circuits throughout the amplitude-modulation wave-signal translating channel, which extends between the loop antenna 10 and the signal-reproducing device 21, and effectively disconnects the output circuit of the frequency detector 26 from the input circuit of audio-frequency amplifier 20. Amplitude-modulated wave signals in the broadcast band are intercepted by the loop antenna 10 and are selectively applied to the frequency-converter system 12 where they are converted to amplitude-modulated intermediate-frequency wave signals. The latter, in turn, are applied by the secondary winding 14 of the transformer 13 to the intermediate-frequency amplifier 15 where they are amplified and translated through the windings 17 and 18 of the transformer 16 to the detector and A. V. C. supply 19. The modulation components are derived from the detector 19 and are supplied to the audio-frequency amplifier 20 for amplification after which they are applied to the signal-reproducing device 21 for reproduction in conventional manner. The A. V. C. bias developed by unit 19 is effective to control the gain of the units 15 and 12 to maintain the signal input to the unit 19 within a relatively narrow range for a wide range of received wave-signal intensities.

Unicontrolled movement of the switch blades 29, 30 and 31 to engage their respective switch points F is effective to interrupt at these points the circuit of the amplitude-modulation signal-translating channel, while at the same time circuits are established completing the frequency-modulation channel between the dipole antenna 11 and the signal-reproducing device 21. It may be noted that movement of the switch 29 transfers the gain-control circuit of the unit 15 from the detector and A. V. C. supply 19 to the automatic-volume-control circuit of the frequency detector 26. Frequency-modulated wave signals intercepted by the dipole antenna 11 and applied to the frequency-converter system 12 are converted to frequency-modulated intermediate-frequency wave signals for application by the winding 22 of the transformer 13 to the input circuit of the intermediate-frequency amplifier 15 where they are selectively amplified and translated through the windings 23, 24 of the transformer 16 to the intermediate-frequency amplifier stage 25. The amplified output signal of the latter is applied to the frequency detector 26 which derives the modulation components and applies them to the audio-frequency amplifier 20 where they are amplified and thereafter applied to the signal-reproducing device 20 for reproduction in a conventional manner. The A. V. C. bias developed by the frequency detector 26 is effective so to control the gain of intermediate-frequency amplifier 15 and the frequency-converter system 12 as to maintain the signal input to the frequency detector 26 within a relatively narrow range for a wide range of received wave-signal intensities.

Referring now more particularly to the portion of the receiver embodying the present invention, the frequency-converter system 12, which effects translation of the amplitude-modulated wave signals and the frequency-modulated wave signals selectively to each of the two described signal-translating channels, comprises a first modulator including a first electron tube 40 having a remote cutoff characteristic. The tube 40 is preferably one of the pentagrid-converter type and is included in the above-described signal-translating channel for amplitude-modulated wave signals. The third or signal-input electrode 41 of the tube 40 is coupled to one terminal of the loop antenna 10 through a parallel-connected resistor-inductor network 43, 44 which is effective to suppress parasitic oscillations. The other terminal of the loop antenna 10 is coupled to ground through series-connected resistors 45 and 46. A condenser 47, which comprises a by-pass condenser for intermediate-frequency wave signals developed during the translation of frequency-modulated wave signals through the frequency-converter system 12, is connected in parallel with the resistors 45 and 46. The junction of the resistors 45 and 46 is coupled by a conductor indicated as A. V. C. to the switch point A of the switch blade 29. A tuning condenser 49 for the loop antenna 10 is connected in parallel between the first-mentioned terminal of the loop antenna and ground.

The anode of the tube 40 is coupled to ground through a condenser 52 which tunes the winding 120 as mentioned above, and is also coupled through the tunable primary winding 53 of the transformer 13, in the amplitude-modulation signal-translating channel of the receiver, and through a resistor 58 to a source of energizing potential indicated as +B. The second and the fourth electrodes 54 and 55, respectively, of the tube 40 are connected together and are coupled through a resistor 58 to the potential source +B. The electrodes 54 and 55 are also coupled to ground through three parallel-connected condensers 154, 155, 56 which comprise, in the order named, a parasitic by-pass condenser, an amplitude-modulation by-pass condenser, and an intermediate-frequency by-pass condenser. The first electrode 59 of the tube 40 is coupled to the cathode thereof through a series circuit which includes a grid-leak resistor 62 and a parallel-connected parasitic-suppressing resistor-inductor network 60, 61. A condenser 63, preferably having a negative temperature coefficient to reduce undesired local-oscillator frequency drift during the initial or warm-up interval of the frequency-converter system 12, is coupled in series with a grid coupling condenser 64 between the heater 65 for the cathode of the tube 40 and the junction of the resistor 62 with the network 60, 61. A condenser 66 is coupled in parallel with the condenser 64 and the resistor 62.

The cathode and the electrodes 54, 59 of the tube 40 essentially comprise the oscillator-tube elements of a heterodyne oscillator 70. The latter includes a pair of parallel-resonant frequency-determining circuits 71 and 72 and a control or selector switch, including a movable switch blade 73, for selectively including individual ones of these circuits in the circuit of the oscillator. The resonant circuit 71 includes a winding 74 which is tuned by a condenser 75 in conventional manner over a frequency range in the vicinity of the amplitude-modulation band of the receiver. One terminal of the resonant circuit 71 is connected to ground and the other terminal thereof is connected to the switch point A of the switch blade 73. The switch blade 73 itself is connected to the junction of the condensers 64 and 66. The winding 74 is inductively coupled to a winding 78 which couples the cathode of the tube 40 to ground through a choke coil 79. The latter is effective to present a high impedance to radio-frequency currents in the frequency-modulation band. For some applications, however, the impedance of the winding 78 at the frequencies last mentioned may be sufficient that the coil 79 may be omitted. The second frequency-determining circuit 72 of the heterodyne oscillator 70 includes a winding 81 that is tuned by a condenser 82 in conventional manner over a frequency range in the vicinity of the frequency-modulation band. This circuit is coupled between the switch point F associated with the switch blade 73 and ground.

The frequency-converter system also includes a second electron tube, preferably of the dual-triode type, having a pair of signal-translating sections 90 and 91 each of which includes an individual space-current path. For convenience, this tube has been conventionally shown as a pair of separated triodes each enclosed within a portion of a common tube envelope and the two triode sections will be referred to hereinafter as the tubes 90 and 91. The tube 90 is utilized as a wave-signal repeater or amplifier of the cathode-input type. The cathode of tube 90 is coupled to ground through a resistor 92 in series with a parallel-resonant circuit comprising an inductor 93, a dampening resistor 94, and a condenser 96 shown in broken lines for the reason that it may be comprised in whole or part by the inherent inter-electrode and wiring capacitances. This parallel-resonant circuit 93, 94, 96 is broadly resonant near the center of the frequency-modulation band. A radio-frequency by-pass condenser 95 is connected in parallel with the resistor 92. The cathode of the tube 90 is coupled through a coupling condenser 97 to one terminal of the dipole antenna system 11 while the other terminal of the latter is connected to ground. The control electrode of the tube 90 is coupled to ground for radio-frequency and intermediate-frequency currents by respective by-pass condensers 101 and 102 and is also coupled to ground through a resistor 103. The control electrode of the tube 90 is also connected by a conductor identified as A. V. C. to the switch point F associated with the switch blade 29. The anode of the tube 90 is coupled to a source of potential +B through a choke coil 105 which is connected in parallel with a condenser 106. The latter is shown in broken lines since it may comprise in whole or in part the distributed capacitance of the coil 105. The source +B is connected to ground through a by-pass condenser 107. The parallel-resonant circuit 105, 106 may be resonant at a frequency in the frequency-modulation band.

The frequency-converter system also includes a modulator 110 in the frequency-modulation channel. This modulator includes the tube 91, the control electrode of which is coupled to the anode of the tube 90 by series-connected coupling condensers 111 and 112 and is also coupled to the switch point F of the switch blade 73 through a coupling condenser 113. A grid-leak resistor 115 is coupled between the control electrode and the cathode of the tube 91. A tunable parallel-resonant circuit, comprising an inductor 117 tuned by a tuning condenser 118, is connected between the junction of the condensers 111 and 112 and ground. The anode of the tube 91 is connected to one terminal of the winding 120 of the transformer 13 and hence to the frequency-modulation wave-signal translating channel of the unit 15 through a parallel-connected resistor-inductor network 121, 122. The other terminal of the winding 120 is coupled to the source of potential +B and is coupled to ground through the condenser 55. A condenser 123 is coupled between the high-potential terminal of the resistor 121 and ground to tune the winding 120 of the transformer 13 to the desired intermediate frequency. The tuning condensers 49, 75, 82, and 118 are mechanically connected for unicontrol operation, as represented by the broken lines 125, 125, while the switch blade 73 is mechanically coupled, as indicated by the broken line 32′, to the switch blade 29 for unicontrol operation therewith.

In considering the operation of the frequency-converter system 12 just described, it will be assumed initially that the switch blade 73 and any switch blades unicontrolled therewith have been moved to their respective switch points A in order to complete the circuits of the amplitude-modulation wave-signal translating channel between the loop antenna 10 and the signal-reproducing device 21. It will also be assumed that the tuning condenser 49 has been adjusted to cause the loop antenna 10 to select a desired wave signal in the amplitude-modulation broadcast band for application to the signal-input electrode of the tube 40, while the tuning condenser 75 has been simultaneously adjusted therewith to tune the heterodyne oscillator 70 to the proper heterodyne frequency. Since the switch blade 73 is connected only to the switch point A, the second modulator 110 and the frequency-modulation amplifier stage 90 are isolated from the heterodyne oscillator portion of the pentagrid-converter tube 40. The first electrode 59 and the second electrode 54 function as the respective control electrode and the anode of a heterodyne oscillator electron coupled to the modulator section of the pentagrid tube 40. With the switch blade 73 connected to a switch point A, the circuit arrangement of the heterodyne oscillator 70 is such that it comprises a conventional Hartley type of oscillator in which the winding 78 is a feed-back winding inductively coupled to the inductor 74 of the resonant circuit 71. In the well-known manner, an amplitude-modulated intermediate-frequency wave signal is derived in the anode circuit of the tube 40 for translation through the windings 53 and 14 of the transformer 13 to the intermediate-frequency amplifier 15 for selective amplification therein. The automatic-gain-control potential derived by the unit 19 is applied through the resistor 46, the loop antenna 10, and the network 43, 44 to the signal-input electrode 41 of the tube 40 and is effective in conventional manner to control the conversion efficiency of the tube 40.

It will now be assumed that the switch blade 73 and the remaining switch blades mechanically coupled thereto are moved to engage their respective switch points F to complete the circuits of the frequency-modulation signal-translating channel of the receiver. The described selective adjustment of the switch blade 73 is effective to disconnect the resonant circuit 71 from the heterodyne oscillator 70 and to couple the resonant circuit 72 between the electrode 59 of the tube 40 and ground. The frequency of the wave signals generated by the heterodyne oscillator 70 is now much higher than that developed when the switch blade 73 is coupled to the switch point A. In addition to changing the operating frequency of the oscillator 70, the described adjustment of the switch blade 73 is effective selectively to couple the oscillator 70 to the modulator 110 and also to provide a different mode of operation for the oscillator. Since the inductors 78 and 79 present a high impedance to radio-frequency currents having a frequency in the vicinity of the frequency-modulation band, the cathode of the tube 40 is maintained at a relatively high radio-frequency potential above ground. A capacitive feed-back network for providing a Colpitts-type oscillator is established by the inter-electrode capacitances of the tube 40. The condenser 66 is effective to modify the extent of the feedback of energy. The heterodyne oscillator 70 therefore now comprises a Colpitts type of oscillator which is capable of developing oscillations having a relatively large amplitude at the high operating frequencies thereof. This type of oscillator is particularly desirable for operation at these high frequencies since it exhibits a reduced tendency to develop parasitic oscillations as compared with a Hartley-type oscillator operating at the same frequency.

A received frequency-modulated wave signal intercepted by the dipole antenna 11 is applied through the coupling condenser 97 to the broadly tuned cathode circuit of the tube 90. The amplified wave-signal output of the latter is translated through the coupling condenser 112 to the tuned input circuit 117, 118 of the modulator 110. The desired frequency-modulated wave signal is selected by the tuned circuit just mentioned and is applied between the control electrode and the cathode of the tube 91 along with the heterodyne oscillations which are supplied through the coupling condenser 113 from the heterodyne oscillator 70. In the well-known manner, the network 121, 122 causes a negative conductance to appear in the input circuit of the tube 91 and thereby tends to reduce the input conductance of the triode modulator 110. Frequency-modulated intermediate-frequency wave signals are derived in the anode circuit of the modulator 91 in conventional manner and are applied through the primary winding 120 and the secondary winding 22 of the transformer 13 to the input circuit of the intermediate-frequency amplifier 15 for amplification thereby as previously explained.

From the foregoing description of the frequency-converter system 12, it will be observed that it is unnecessary to employ a plurality of input-circuit switches selectively to connect antennas 10 and 11 to the frequency-converter system 12. It will also be noted that regardless of the position of the switch blade 73 the anode circuit of the pentagrid-converter tube 40 and the anode circuit of the modulator tube 110 are always coupled to the transformer 13. However, by virtue of the very great frequency difference between the received amplitude-modulated and frequency-modulated wave signals and also between the two selectable operating frequencies of the oscillator 70, only the desired intermediate-frequency wave signals have the correct frequency for translation by the intermediate-frequency amplifier 15 in each position of adjustment of the switch blade 73. The desirable provision of a stage of radio-frequency amplification in the frequency-modulation translating channel of the receiver may be inexpensively accomplished by the use of the present invention and without the need of an additional amplifier tube, this for the reason that the frequency-modulation channel of the frequency-converter system 12 may utilize a dual-triode type of tube having individual sections which perform the respective functions of the radio-frequency amplifier and modulator.

Since a pentagrid converter is employed in the amplitude-modulation channel of the frequency-converter system 12 and a triode type of oscillator-modulator arrangement is utilized in the frequency-modulation channel thereof, a high conversion efficiency may readily be secured in each of the two channels of the converter system particularly in that the selective modification of the circuit arrangement of the heterodyne oscillator 70 by way of the switch blade 73 is such that each of the two circuit arrangements thereof produces heterodyne oscillations of optimum amplitude for high conversion efficiency. By virtue of the fact that a single heterodyne oscillator 70 is utilized, with proper circuit modification thereof when operating in each of the two channels of the frequency-converter system 12, the need for the customary two separate heterodye oscillators in a frequency-converter system having amplitude-modulation and frequency-modulation signal-translating channels is avoided. The triode-type modulator 110 which is employed in the frequency-modulation channel of the converter system 12 provides a better signal-to-noise ratio than does a pentagrid converter when translating such high-frequency wave signals. The use of a triode modulator in the frequency-modulation channel of the frequency-converter system 12 also has the advantage that the tendency toward parasitic oscillations is less than that which would prevail if a pentagrid type of frequency converter were employed at these high frequencies. Band switching is exceptionally simple in the present receiver since it requires but a single switch of simple construction comprising a single switch blade 73 and only one pair of switch points A and F.

While applicant does not intend to limit the invention to any particular values of circuit constants, the following values have been found suitable for an embodiment of the invention of the type represented in Fig. 1:

| | |
|---|---|
| Resistors 43 and 60 | 22 ohms, ½ watt |
| Resistor 45 | 22 megohms |
| Resistor 46 | 1 megohm |
| Resistor 58 | 470 ohms |
| Resistor 62 | 22 kilohms |
| Resistor 92 | 220 ohms |
| Resistor 94 | 1.5 kilohms, 2 watts |
| Resistors 103 and 115 | 470 kilohms |
| Resistor 121 | 820 ohms, ½ watt |
| Condenser 49 | 480 micromicrofarads (max.) |
| Condensers 52, 111, 112, and 123 | 100 micromicrofarads |
| Condensers 95, 101, 107, and 154 | 500 micromicrofarads |
| Condenser 113 | 2 micromicrofarads |
| Condenser 155 | 0.01 microfarad |
| Condensers 56 and 102 | 5000 micromicrofarads |
| Condenser 63 | 2 micromicrofarads (negative temperature coefficient) |
| Condenser 64 | 30 micromicrofarads |
| Condenser 66 | 3 micromicrofarads |
| Resonant frequency of loop 10 and condenser 49 | 540 to 1620 kilocycles |
| Resonant frequency of circuit 71 | 995 to 2075 kilocycles |
| Resonant frequency of circuit 72 | 98.7 to 118.7 megacycles |
| Resonant frequency of circuit 117, 118 | 88 to 108 megacycles |
| Inductor 44 | 3 turns No. 26 enamel wire wound on resistor 43 |
| Inductor 61 | 2 turns No. 26 enamel wire wound on resistor 60 |
| Windings 79 and 105 | Each 76 turns No. 36 enamel wire, close wound on 3/16" molded form |
| Winding 78 | 7¼ turns No. 34 DNC wire, universal wound on 3/16" diameter paper tubing |
| Winding 74 | 79 turns No. 34 DNC wire, universal wound over winding 78 and in same direction. Inductance at 1 kilocycle 120 microhenries |
| Winding 93 | 8¾ turns No. 18 enamel wire wound on resistor 94 |
| Winding 122 | 4½ turns No. 26 enamel wire wound on resistor 121 |
| Tube 40 | Type 12BE6 |
| Tube 90 | ½ twin-triode type 12AT7 |
| Tube 91 | ½ twin-triode type 12AT7 |
| +B | 110 volts |

Referring now to Fig. 2 of the drawings, there is represented a wave-signal receiver including a frequency-converter system embodying the invention in a modified form which is generally similar to that represented in Fig. 1, corresponding elements being designated by the same reference numerals and similar elements by the same reference numerals primed. The amplitude-modulation channel of the receiver represented in Fig. 2 is essentially the same as that represented in Fig. 1. However, the frequency-modulation channel is somewhat different in the frequency-converter portion thereof and includes a self-quench superregenerative superheterodyne system of the type disclosed and claimed in applicant's copending application Serial No. 788,570, filed November 28, 1947, and entitled "Superregenerative Superheterodyne Wave-Signal Receiver" now Patent No. 2,588,022 granted March 4, 1952. Furthermore, the output circuit of the converter in the frequency-modulation channel of the receiver represented in Fig. 2 is coupled to the input circuit of the audio-frequency amplifier 20 rather than to the input circuit of the intermediate-frequency amplifier 15. Referring now more particularly to the frequency converter 110', which comprises a superregenerative amplifier of a side-tuned superregenerative superheterodyne system, the tube 91' serves as the regenerator tube thereof. The tube 91', which may comprise a pentode but is preferably a triode, has an anode 161 and a control electrode 162 which are effectively coupled, in a manner to be described hereinafter, across a frequency-determining circuit resonant at a rather high intermediate frequency which may have the value of such as 21.75 megacycles. The frequency-determining circuit includes condensers 163 and 164, which are coupled in series between the anode 161 of the tube 91' and ground through a condenser 129, and an inductor 125 which is connected between the anode 161 and the junction of the condensers 164 and 129 through a by-pass condenser 130. A resistor 128 is connected in parallel with the condenser 130 and the junction of the former with the inductor 125 is connected through a resistor 127 to a movable switch blade 150. The switch blade 150 has a pair of switch points F and A, the former being connected to the source of potential +B. A damping resistor 126 is included in the frequency-determining circuit and is connected in shunt with the inductor 125 to provide sufficient positive damping of the frequency-determining circuit during each positive-conductance interval thereof.

The cathode of the tube 91' is coupled to ground through a series-connected network comprising a radio-frequency choke coil 131, which presents a high impedance to wave signals having a frequency corresponding to the oscillatory frequency of the superregenerative circuit, a resistor 132, and a resistor 133. A radio-frequency choke coil 165, which presents a high impedance to wave signals having approximately the frequency of the received wave signals applied to the control electrode 162 of the tube 91' by the radio-frequency amplifier 90, is connected between the control electrode 162 and the junction of the condensers 164 and 130. The superregenerative amplifier also includes quench means for controlling the conductance variations of the regenerative circuit to provide superregenerative operation. This means may be either a separate quench oscillator or a suitable network by which to enable the self-quenching of the regenerative circuit. By way of example, a self-quench network is employed in the superregenerative amplifier represented in Fig. 2. The self-quench network comprises the resistor 132 and a condenser 143 coupled across the latter through a condenser 145. One terminal of the condenser 143 is coupled to the junction of the radio-frequency choke coil 131 and the resistor 132 while the other terminal thereof is coupled to the junction of the condenser 129 and the choke coil 165.

Grid-circuit stabilization of the operating characteristics of the superregenerative amplifier against variations of operating conditions which tend to modify its average self-quench period is provided by a resistor-condenser network comprising the resistor 128 and the condenser 145. Grid-circuit stabilization of this type is disclosed and claimed in a copending application of Donald Richman, Serial No. 788,765, filed November 28, 1947, and entitled "Self-Quench Superregenerative Receiver." Additional stabilization is afforded by a cathode-stabilizing network comprising the condenser 145 and the resistor 133. Stabilizing networks of the latter type are disclosed and claimed in applicant's copending application Serial No. 753,236, filed June 7, 1947, and entitled "Superregenerative Receiver."

Modulation components of the received wave signal are derived across the resistor 133 by the operation of the superregenerative superheterodyne system and are coupled to the input circuit of the audio-frequency amplifier 20 through a conventional resistor-condenser filter network 146, 147, a coupling condenser 148 and a voltage divider 170 when a switch blade 149 is selectively connected to its switch point F. The switch blades 73, 150 and 149 are mechanically coupled together for unicontrol operation as indicated by the broken lines 151, 151.

In considering the operation of the wave-signal receiver of Fig. 2, it will be assumed initially that the switch blades 73, 150 and 149 are adjusted to engage their respective switch points A. This effectively disconnects the resonant circuit 72 from the heterodyne oscillator 70, removes the potential energization +B from the amplifier 110', and also disconnects the modulation-signal output circuit of the superregenerative amplifier 110' from the input circuit of the audio-frequency amplifier 20. The described selective adjustment of the switch blades just mentioned is effective to complete the circuits in the amplitude-modulation channel between the loop antenna 10 and the signal-reproducing device 21. Amplitude-modulated wave signals intercepted by the loop antenna 10 are translated through the amplitude-modulation wave-signal channel of the receiver in the manner previously described in detail in connection with the receiver represented in Fig. 1.

In considering the operation of the wave-signal receiver during the reception of frequency-modulated wave signals, it will be assumed that the switch blades 73, 150 and 149 are adjusted to engage their respective switch point F as represented in Fig. 2. The switch 73 is then effective to couple the resonant circuit 72 in the control electrode-cathode circuit of the heterodyne oscillator 70 so that the latter generates high-frequency wave signals of the proper frequency for application through the coupling condenser 113 to the control electrode of the regenerator tube 91' of the superregenerative amplifier 110'. The frequency-modulated wave signals intercepted by the dipole antenna 11 are amplified by the radio-frequency amplifier 90 and are applied to the resonant circuit 117, 118 where the desired frequency-modulated wave signal is selected for application to the control electrode 162 of the tube 91'. The energizing potential supplied through the switch blade 150 and the resistor 127 to the superregenerative amplifier from the source +B permits oscillations to increase in amplitude in the regenerative circuit during the oscillatory build-up interval thereof. The nonlinear translating characteristic of the regenerator tube 91' during each oscillatory build-up interval causes the derivation, in the output circuit of the tube by the heterodyning of the received wave signal and the heterodyne wave signal, of an intermediate-frequency wave signal having a mean frequency which lies on the sloping side of the frequency-response characteristic of the superregenerative amplifier 110'. Thus the received frequency-modulated wave signal is converted to an amplitude-modulated intermediate-frequency wave signal and the last-mentioned signal is then amplified in a conventional manner by the superregenerative operation of the system. The circuit parameters of the superregenerative amplifier 110' are so selected that the intermediate-frequency oscillations quickly reach an equilibrium amplitude value and remain thereat for a short period comprising the duration of the saturation-level interval of the superregenerative circuit. During the last-mentioned interval the bias developed across the condenser 143 from the anode current of the tube 91' acquires a value sufficient to bias the tube to anode-current cutoff, thereby terminating the saturation-level interval and initiating the oscillatory-decay interval. As the charge accumulated in the condenser 143 is dissipated by the resistor 132, the voltage across the condenser decreases to a sufficiently low value that the tube 91' is again enabled to become conductive, thus initiating a new cycle of self-quench operation similar to that just described.

As is more fully explained in applicant's abovementioned application, Serial No. 753,236, the self-quench period of the superregenerative circuit varies dynamically in accordance with the amplitude modulation of the derived intermediate-frequency wave signal and hence in accordance with the frequency modulation of the received frequency-modulated wave signal. These dynamic variations of the quench rate are manifest as dynamic variations in the anode current of the regenerator tube 91'. Accordingly a voltage which varies in accordance with the derived modulation components is developed across the resistor 133 for application through the filter network 146, 147, the coupling condenser 148, the switch blade 149 and the voltage divider 170 to the audio-frequency amplifier 20 for amplification therein and translation to the signal-reproducing device 21.

Since the resonant circuit 71 is disconnected from the tube 40, amplitude-modulated wave signals intercepted by the loop antenna 10 are not converted by the pentagrid-converter tube 40 to intermediate-frequency signals for application to the intermediate-frequency transformer 13. The resonant frequency of the loop antenna 10, as established by the adjustment of the tuning condenser 49, is such that the antenna presents a low impedance to ground for any received frequency-modulated wave signals. Accordingly, any such signals cannot be converted by the pentagrid-converter tube 40 to an intermediate-frequency signal for application to the intermediate-frequency amplifier 15. Thus it will be seen from the foregoing explanation that the heterodyne oscillator 70 is adapted for selective operation as a portion of a frequency-converter system of the pentagrid-converter type and also is suited for operation as the heterodyne oscillator for a superregenerative-type modulator included in the frequency-modulation channel of a combined amplitude-modulation and frequency-modulation wave-signal receiver.

Referring now to Fig. 3 of the drawings, there is schematically represented a television receiver of the superheterodyne type which includes a frequency-converter system embodying the present invention. The receiver there represented is arranged for selective operation on each of a plurality of television channels. To simplify the representation, the receiver has been shown as one which is adapted for reception on two television channels. However, it will be understood that provision may be made for reception on more than two such channels if desired. The receiver includes a dipole antenna 310, for intercepting wave signals having the frequency of a first television channel, which is coupled to a first radio-frequency amplifier 311. The receiver also includes a second dipole antenna 312, which is adapted to receive wave signals on a second television channel, coupled to the input circuit of a second radio-frequency amplifier 313. The output circuits of the radio-frequency amplifiers 311 and 313 are coupled to individual input circuits of a frequency-converter system 314. In particular, the output circuit of the radio-frequency amplifier 311 is coupled to the input circuit of a first modulator 315 and the output circuit of the amplifier 313 is coupled to the input circuit of a second modulator 316. A controllable-frequency heterodyne os-oscillator 317 is coupled to the first modulator 315 and is also coupled to the second modulator 316. The heterodyne oscillator may be of the continuously tunable type or may include a pair of frequency-determining circuits and a switch arranged in a manner similar to that of Figs. 1 and 2. By thus adjusting the operating frequency of the oscillator, the modulators 315 and 316 are caused by frequency conversion selectively to translate with the correct intermediate frequency individual ones of the wave signals intercepted by the dipole antennas 310 and 312.

The output circuits of the modulators 315 and 316 are coupled in cascade, in the order named, to an intermediate-frequency amplifier 318 of one or more stages, a detector and automatic-contrast-control or A. C. C. supply 319, a video-frequency amplifier 320 of one or more stages, and a cathode-ray image-reproducing device 321.

The cathode-ray image-reproducing device 321 includes the usual line-frequency and field-frequency scanning coils for deflecting its cathode-ray beam in two directions normal to each other. An output circuit of the video-frequency amplifier 320 is coupled to the input circuits of a line-frequency generator 323 and a field-frequency generator 324 through a synchronizing-signal separator and amplifier 322. The output circuits of the generators 323 and 324 are coupled to the scanning coils of the image-reproducing device 321 in a conventional manner. The units 310 to 324, inclusive, with the exception of the frequency-converter system 314 which includes units 315 to 317 constructed in accordance with the present invention, may be of conventional construction and operation so that a detailed description and explanation of the operation thereof are unnecessary herein.

In considering briefly, however, the general operation of the above-described receiver as a whole, it will be assumed initially that the frequency of the heterodyne oscillator 317 is adjusted to apply heterodyne wave signals of the proper frequency to the modulator 315. Television signals having the frequency of a first television channel intercepted by the dipole antenna 310 are selected and amplified in the radio-frequency amplifier 311 and are applied to the modulator 315 wherein they are further selected to the exclusion of undesired wave signals and are converted to intermediate-frequency wave signals. The latter in turn are selectively amplified in the intermediate-frequency amplifier 318 and are delivered to the detector and automatic-contrast-control supply 319. The modulation components of the signal are derived by the detector 319 and are supplied to the video frequency amplifier 320 wherein they are amplified and then supplied to the input electrodes of the image-reproducing device 321. A control voltage derived by the automatic-contrast-control supply of unit 319 is applied as an automatic-amplification-control bias to the gain-control circuits of units 311 and 318 to maintain the signal input to the detector of unit 319 within a relatively narrow range for a wide range of received signal intensities.

Unit 322 selects the synchronizing signals from the other modulation components of the composite television signal applied thereto from the video-frequency amplifier 320 and then amplifies these selected signals. The line-synchronizing and the field-synchronizing signals are separated from each other by the unit 322 and are then supplied to individual ones of the generators 323 and 324 to synchronize the operation thereof. The intensity of the electron beam produced by the image-reproducing device 321 is controlled in accordance with the video-frequency voltages impressed on the device. Scanning waves are generated in the line-frequency and field-frequency generators 323 and 324, respectively, and are applied to the scanning coils of the device 321 to produce scanning fields, thereby to deflect the cathode-ray beam in two directions normal to each other to trace a recilinear scanning pattern on the screen of the device and thereby reconstruct the translated picture.

In order to translate television signals having the frequency of the second television channel, the frequency of the heterodyne oscillator 317 is merely adjusted such as to apply heterodyne wave signals of the proper frequency to the modulator 316 as to cause television signals applied thereto and having the frequency of the second television channel to beat with the heterodyne wave signal and develop an intermediate-frequency television signal of the proper value for application to the intermediate-frequency amplifier 318. The derived intermediate-frequency wave signal is then detected and translated through the units 319 to 324, inclusive, in the well-known manner.

It will be noted that the output circuits of the modulators 315 and 316 are always coupled to the intermediate-frequency amplifier 318 and that the heterodyne oscillator 317 may if desired continuously supply heterodyne oscillations to both modulators. As long as the differences between the frequencies of the wave signals of the several transmission channels are sufficiently large, the oscillator 317 may be so tuned that only one intermediate-frequency wave signal of the several which may be derived by the modulators 315 and 316 has the proper value of frequency to be translated through the frequency-selective circuits of the intermediate-frequency amplifier 318. The frequency-converter system 314, by its selective operation, thus is effective by frequency conversion selectively to translate a first television signal having the frequency of a first television channel and a second television signal having the frequency of a second television channel entirely without the need for any antenna-switching arrangements. Accordingly a television receiver of the type described may advantageously employ a dipole antenna 310 which is physically dimensioned and so oriented that its directivity and impedance characteristics are most favorable for optimum reception of television signals from a television transmitter operating on a first television channel, while the dipole antenna 312 may be of such length and orientation that its directivity and impedance characteristics optimize the reception of television signals from a second television transmitter operating at a frequency in a second television channel. The use of the present invention thus permits effective electrical switching between a plurality of antennas merely by a suitable control of the frequency of a heterodyne oscillator used in conjunction with a plurality of modulators operating in different television channels.

From the foregoing description of the various embodiments of the invention, it will be apparent that a frequency-converter system embodying the invention effects band switching in a manner which does not contribute greatly to the development of undesired parasitic oscillations. It will also be clear that a frequency-converter system embodying the invention has particular utility when used in a television receiver, a combined amplitude-modulation and frequency-modulation wave-signal receiver, or in a combined amplitude-modulation and television receiver. A frequency-converter system embodying the present invention affords the advantages of high conversion efficiency in each of the wave-signal translating channels thereof, provides large signal output with a small number of electron tubes, and is characterized by its simplicity of construction and inexpensiveness to manufacture.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

A frequency-converter system for effecting translation of modulated wave signals, having individual different frequencies, selectively through either of two wave-signal translating channels comprising: a first modulator, including a first electron-discharge device included in only one of said channels, adapted to have wave signals of a first frequency applied thereto; a second modulator, including a self-quench superregenerative amplifier having a second electron-discharge device in only the other of said channels, adapted to have wave signals of a second frequency applied thereto; and a single controllable-frequency heterodyne oscillator for both said modulators, electron-coupled to said first electron-discharge device, for applying to said modulators heterodyne wave signals and including a control for adjusting the frequency of said oscillator to cause said modulators by frequency conversion selectively to translate individual ones of said applied wave signals, said heterodyne oscillator forming with said superregenerative amplifier a self-quench superregenerative system for deriving in said amplifier the modulation components of said wave signals of said second frequency.

BERNARD D. LOUGHLIN.

REFERENCES CITED

The following references are of record in the file of this patent:

UNITED STATES PATENTS

| Number | Name | Date |
| --- | --- | --- |
| 1,734,894 | Carlson | Nov. 5, 1929 |
| 2,068,002 | Batchelor | Jan. 19, 1937 |
| 2,093,416 | Case | Sept. 21, 1937 |
| 2,100,605 | Linsell | Nov. 30, 1937 |
| 2,167,605 | Carlson | July 25, 1939 |
| 2,273,090 | Crosby | Feb. 17, 1942 |
| 2,302,951 | Peterson | Nov. 24, 1942 |
| 2,351,221 | Mountjoy | June 13, 1944 |
| 2,508,048 | Sziklai | May 16, 1950 |
| 2,571,001 | Anderson | Oct. 9, 1951 |
| 2,580,051 | Torre et al. | Dec. 25, 1951 |

FOREIGN PATENTS

| Number | Country | Date |
| --- | --- | --- |
| 525,968 | Great Britain | Sept. 9, 1940 |